(12) United States Patent
Perry

(10) Patent No.: US 12,375,551 B1
(45) Date of Patent: Jul. 29, 2025

(54) METHOD OF AND SYSTEM FOR CONNECTING ARTISTS AND MANAGERS IN THE MEDIA INDUSTRY TO FACILITATE COLLABORATION AND INITIATE AGREEMENTS

(71) Applicant: Brittany Perry, West Hollywood, CA (US)

(72) Inventor: Brittany Perry, West Hollywood, CA (US)

(73) Assignee: Brittany Perry, West Hollywood, CA (US)

( * ) Notice: Subject to any disclaimer, the term of this patent is extended or adjusted under 35 U.S.C. 154(b) by 8 days.

(21) Appl. No.: 19/009,906

(22) Filed: Jan. 3, 2025

(51) Int. Cl.
*H04L 67/06* (2022.01)

(52) U.S. Cl.
CPC .................................. *H04L 67/06* (2013.01)

(58) Field of Classification Search
CPC ....................................................... H04L 67/06
See application file for complete search history.

(56) References Cited

U.S. PATENT DOCUMENTS

| | | | | |
|---|---|---|---|---|
| 7,263,497 | B1 * | 8/2007 | Wiser ................. | G06Q 30/0633 705/26.8 |
| 8,234,175 | B2 | 7/2012 | Fisher et al. | |
| 8,291,238 | B2 | 10/2012 | Ginter et al. | |
| 8,543,665 | B2 | 9/2013 | Ansari et al. | |
| 8,572,083 | B1 | 10/2013 | Snell et al. | |
| 8,712,825 | B1 | 4/2014 | Holcombe et al. | |
| 8,908,567 | B2 | 12/2014 | Mikkelsen et al. | |
| 10,459,977 | B2 | 10/2019 | Maharajh et al. | |
| 11,551,212 | B2 | 1/2023 | Malhortra et al. | |
| 12,045,870 | B2 | 7/2024 | Peters et al. | |
| 2008/0133311 | A1 * | 6/2008 | Madriz Ottolina ......... | G06Q 30/0273 705/14.69 |
| 2008/0147558 | A1 * | 6/2008 | Kraus ..................... | G06F 21/10 713/150 |
| 2010/0332404 | A1 | 12/2010 | Valin | |
| 2012/0197785 | A1 | 8/2012 | Cooper et al. | |
| 2019/0318348 | A1 | 10/2019 | Brenner et al. | |
| 2021/0241243 | A1 | 8/2021 | Wiklof et al. | |
| 2021/0286490 | A1 * | 9/2021 | D'Amore .............. | G06Q 10/06 |
| 2024/0177256 | A1 * | 5/2024 | Sergay ................ | G06Q 10/067 |
| 2024/0185182 | A1 | 6/2024 | Perry | |
| 2024/0370143 | A1 | 11/2024 | D'Amore et al. | |

FOREIGN PATENT DOCUMENTS

| | | |
|---|---|---|
| AU | 2008229176 B2 | 1/2013 |
| WO | 2023022935 A1 | 2/2023 |

* cited by examiner

*Primary Examiner* — Benjamin M Thieu

(74) *Attorney, Agent, or Firm* — Nicholas Palacio

(57) ABSTRACT

The disclosed invention relates to a software environment that brings artists, managers, publishers, and record label executives together to discover new media and initiate agreements over the source or use of media. The invention allows managers and artists to request the source or use of uploaded media and initiate negotiation of agreements. The invention also permits managers and artists to associate with one another, so that managers can perform tasks on behalf of the artist.

20 Claims, 6 Drawing Sheets

METHOD OF AND SYSTEM FOR CONNECTING ARTISTS AND MANAGERS IN THE MEDIA INDUSTRY TO FACILITATE COLLABORATION AND INITIATE AGREEMENTS

BACKGROUND

Creation of media content has grown exponentially in recent years. The growth in new content is fostered by new technologies, devices, creative mediums, and digitization processes.

Media that has largely been created by recording artists and performers with microphones and cameras, have in turn favored other disruptive technology, such as using computers to create art. Analog recording studios have largely been replaced with video and music producers who use their computers to create and edit creative works electronically. Accordingly, disruptive technology has placed into the hands of artists the means to create art and distribute it without necessarily involving such established organizations such as movie studios and music companies. Instead, artists may use software on computers to create audio and video programs at home.

As a result of artists being able to create media at home, media creation has undergone exponential growth, giving rise to a new wave of creators, musicians, and remixers. The music community generally consists of artists that sample, mix, modify, and compile snippets of other music created by other artists. With the advent of the internet and digital media processing, media has exploded because users can more easily create their own music and videos.

Artists can create media and in turn share them with their audience or other interest parties. Platforms exist for artists to publish their media electronically, but these are typically limited to online marketplaces where individuals can purchase an artist's work. Despite the availability of distribution hardware and software, artists have been slow and have even completely resisted electronic distribution (self-publication) as a mechanism to distribute their works for fear of not being paid and credited for their work. Unfortunately, this hampers their ability to market their media to interested parties.

The process by which artists and media creators have been traditionally managed by divisions and positions in music companies called "A&R" or artists and repertoire. A&R roles are responsible for finding new recording artists and bringing those artists licensing and recording contracts. A&R roles are expected to be able to find artists who will be commercially successful. For this reason, people who fill A&R roles can come from all walks of life.

An A&R executive is generally authorized to offer an artist a recording contract, often in the form of a "deal-memo", a short informal document that establishes a business relationship between the recording artist and the music company. The actual contract negotiations will typically be carried out by competing and opposing entertainment lawyers, hired by the artist's management team and the music company. Likewise, in the production of creative video works for television or movies a similar process occurs. With the prior art, the dealmakers, such as A&R executives, rely significantly on the word of mouth of trusted associates, critics, business contacts, and those with a proven record of success. Predictably, the dealmakers tend to favor the artists that have access to the same connections as the dealmakers and those that are most familiar to themselves.

In their current state, A&R divisions of a record label traditionally oversee the recording process. A&R work includes helping the artist to find the right record producer, scheduling time in a recording studio and advising the artist on all aspects of making a high-quality recording. The A&R division works with the artist to choose the best songs (i.e., repertoire) for their record. For artists who do not write their own music, the A&R person assists in finding songs and songwriters and brings them together to collaborate. A&R executives maintain contact with their counterparts at music publishing companies to get new songs and material from songwriters and producers. The availability of songwriter material to be available before the media was in finished form, (for example, "beats") was not possible unless you knew of the source.

Current forms of electronic distribution and marketing for media is not effectively connecting artists with decision makers in the media industry. If A&R and publishing departments continue to utilize the current marketplaces and sites that contain self-published media, A&R and publishing departments will need to sift through thousands of hours of media to find their next media hit or artist to promote. This time cost is likely a poor investment for A&R departments. The high time cost leads to A&R departments relying on finding employees with personal and industry contacts to find their next marketable artist and media. This reliance on need to hire talent with the right personal connections creates an insular media industry where individual personalities and connections often become the primary driver in partnerships, media production, discovery, and collaboration.

It is difficult for individuals, organizations, and entities to monetize their content. It is even more difficult to ensure that their content is licensed, monetized, and distributed properly when published. Derivative works and compilations have frequently triggered the need for copyright royalties to be divided. However, younger generations of artists are often not familiar with the correct legal protocol for creating new works of art based on prior copyrighted works of art, notably music. Instead, current artists are often taught to avoid adapting what is old with a new expression of that art, resulting in artists being overlooked in new credits as a foundational element in a new creative work which may be classified as a derivative work or compilation. Often, competing music companies steer new artists towards one foundational body of work versus another, stifling creativity.

Advancements in technology are constantly influencing and evolving media content industry, not only in how media is distributed and stored, but also in how media is created, and how ownership and credit can be properly attributed to artists. Media can now be created digitally from its conception. Many users compile and mix various media samples digitally for distribution as their own media.

Innovations relating to the discovery of media and creating collaborations have stagnated. Individual artists and managers still rely on their personal and professional contacts to help discover the media and make connections with other artists and managers. The reliance on personal contacts to discover music often leads to individual personalities getting in the way of artists and managers discovering and creating new media. There currently is a need to create a music-oriented discovery platform where artists, A&R divisions, and publishing divisions are joined seamlessly. Additionally, there is a need in the industry to distribute media digitally and electronically while preserving and facilitating all of the associated intellectual property rights and deals. Additionally, there is a need for an environment where artists and managers can easily discover media and engage in negotiations over the source or use of the media.

SUMMARY

This invention relates to an environment to bring artists, managers, publishers, and music company executives together to discover new media and initiate agreements over the source or use of media. The invention also relates to an environment where artists can upload their media and share their media with artists, publishers, and executives within the music industry.

In one embodiment, one or more identifiers are associated with the uploaded media to categorize and organize the media. In one embodiment, the one or more identifiers may include a tempo identifier, wherein the tempo identifier is calculated after the media is uploaded. In one embodiment, the one or more identifiers may include a music genre, wherein the genre of music may be identified by a computer or may be assigned by a user. In one embodiment, the one or more identifiers may include a form of copyright detection integrated into one or more portions of the media to watermark the content.

DETAILED DESCRIPTION

Figure 1:
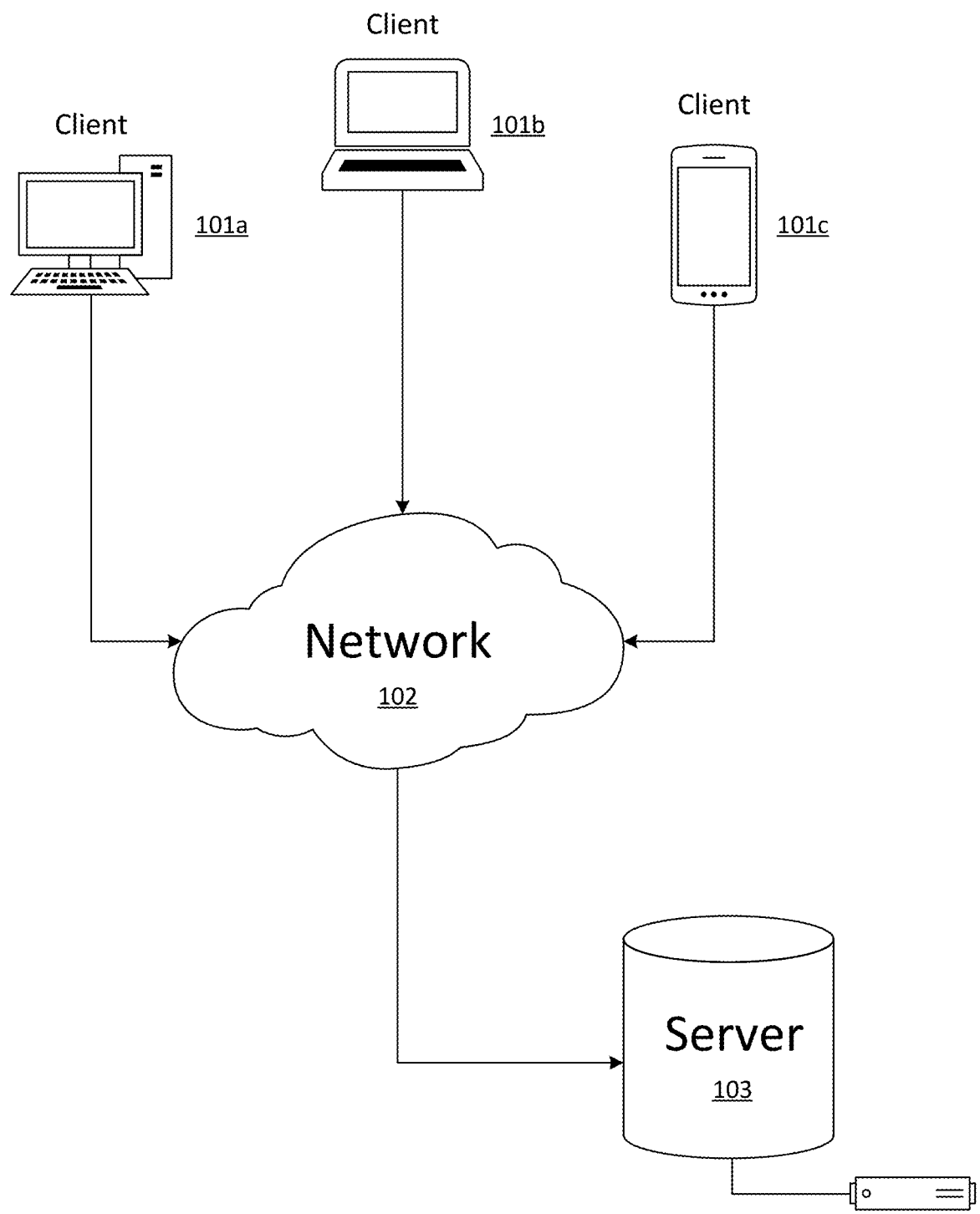
FIG. 1 illustrates a high-level flow diagram of a server connected to clients over a network in which various computer-implemented methods of the present invention in accordance with some embodiments.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The invention can be implemented in numerous ways, including as a process; a system; a computer program product embodied on a computer readable storage medium and/or a server, such as a server configured to execute instructions stored on and/or provided by a memory coupled to the server. In general, the order of the steps of disclosed processes may be altered within the scope of the invention. Unless stated otherwise, a component such as a server or a memory described as being configured to perform a task may be implemented as a general component that is temporarily configured to perform the task at a given time or a specific component that is manufactured to perform the task. As used herein, the term 'server' refers to one or more circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description to provide a thorough understanding of the invention. These details are provided for the purpose of example, and the invention may be practiced according to the claims without some or all of these specific details. For clarity, technical material that is known in the technical fields related to the invention has not been described in detail so that the invention is not unnecessarily obscured.

The servers and databases may represent a portion of the content platform. In one embodiment, the servers may include a web server utilized to provide a website and user interface (e.g., user interface) for interfacing with numerous users. Information received by the web server may be managed by the content platform managing the servers and associated databases. For example, the web server may communicate with the database to respond to read and write requests. The databases may utilize any number of database architectures and database management systems (DBMS) as are known in the art. Databases can be used as a reference for data such as but not limited to, relational databases, structured databases, unstructured databases, semi-structured databases, key-value databases, object-oriented databases, columnar databases, distributed databases, cloud databases, full-text search databases, and embedded databases. The databases may store the content associated with each user. Any number of secure and/or unique identifiers, such as watermarks, may be utilized to ensure that content information is not improperly shared or accessed.

A user interface may be made available through various client devices. In one embodiment, the user interface presents a graphical user interface or other interface that may be utilized to create, manage, license, and distribute content. The graphical user interface may be presented based on execution of one or more mobile applications, programs, browsers, kernels, modules, scripts, operating systems, or specialized software that is executed by one of the client devices. The user interface may be utilized to set the user preferences, parameters, and configurations of the user devices as well as upload and manage the content sent to the server.

The server may aggregate, manage, analyze, and process content and user requests across the network and any number of networks, sources, and third-party resources. For example, the network may represent any number of public, private, virtual, specialty, or other network types or configurations. The different components of the system, including the user devices, may be configured to communicate using wireless communications, such as Bluetooth, Wi-Fi, satellite connections, Wi-Fi, WiMAX, 3G, 4G, 5G, LTE, personal communications systems, DMA wireless networks, and/or hardwired connections, such as fiber optics, T1, cable, DSL, high speed trunks, powerline communications, and telephone lines. Any number of communications architectures including client-server, network rings, peer-to-peer, n-tier, application server, mesh networks, fog networks, or other distributed or network system architectures may be utilized.

The network may represent a single communication service provider or multiple communications services providers.

Although not shown, the server may include any number of load balancers. The load balancer is one or more devices configured to distribute the workload of processing the content from multiple users to optimize resource utilization, throughput, and minimize response time and overload. For example, the load balancer may represent a multilayer switch, database load balancer, or a domain name system server. The load balancer may facilitate communications and functionality (e.g. database queries, read requests, write requests, command communications, stream processing, etc.) between the user devices and the server. Other intelligent network devices may also be utilized within the server. As discussed above, the various embodiments can be implemented in a wide variety of operating environments, which in some cases can include one or more user computers, computing devices, or processing devices which can be used to operate any of a number of applications.

In some embodiments, the system may be utilized by any number of users, organizations, or providers to aggregate, manage, license, review, analyze, process, and distribute creative content. In some embodiments, the creative content represents music, works of art, and software that may be uploaded through client devices. Client devices can include any of a number of general-purpose personal computers, such as desktop or laptop computers running a standard operating system, as well as cellular, wireless, and handheld devices running mobile software and capable of supporting a number of networking and messaging protocols. Client devices may be utilized to view, listen to, or otherwise interact with communications or content. The client devices may communicate wirelessly or through any number of fixed/hardwired connections, networks, signals, protocols, formats, or so forth. In some embodiments, the client devices communicate with the server through a network connection. In some embodiments, the client devices may be utilized to interact with the server and media files, such as but not limited to play content, pause playback, skip content, generate playlists or organize content, rate/rank content, manage content, and initiate negotiations. In some embodiments, the system may utilize any number of identifiers such as but not limited to passwords, pin numbers, certificates, digital identifiers/biometrics, signatures, secure channels, connections, or links, and virtual private networks to secure the content and negotiate agreements. The client devices are representative of multiple devices that may be utilized to upload or communicate content. The client devices utilize any number of applications, browsers, gateways, bridges, or interfaces to communicate over the network with the server, databases, and associated components.

In some embodiments, media can be audio files, such as but not limited to studio recordings, live recordings, mixes, remixes, soundtracks, instrumentals, a Capella, demo tracks, mashups and music covers.

In some embodiments, agreements can be music agreements, such as but not limited to sync licenses, master use licenses, performance licenses, mechanical licenses, royalty-free licenses, print licenses, work-for-hire agreements, exclusive licenses, non-exclusive licenses, exclusive publishing agreements, co-publishing agreements, artist recording agreements, sample licenses, soundtrack licenses, broadcast licenses, micro licenses, composition licenses, distribution or streaming licenses, or any such agreement which gives third-party users the ability to license the rights to copy, reproduce, distribute, and perform the content or material as desired.

In some embodiments, artists can be media contributors, such as but not limited to writers, composers, bands, lyricists, producers, singers, instrumentalists, performers, collaborators, influencers, musicians, engineers, editors, mixers, DJs, mixers, and anyone else who contributes to the creation of media.

In some embodiments, identifiers can be data associated with music files, such as but not limited to tempo, watermarks, genres, artist, co-artist, owner, co-owner, author, co-author, songwriter, co-songwriter, publishing date, uploaded timestamp file type, tags, associated users, affiliated publisher, affiliated label, which track uses it as a sample, which track uses it as an interpolation, and affiliated Interested Party Information (IPI) numbers.

In some embodiments, managers can be people affiliated with the music industry who oversee artists, such as but not limited to music producers, A&R, talent scouts, music scouts, executives, managers, publishers, distributors, lawyers, copyright administrators, consultant, director, senior director, vice president, president, and licensing agents. In some embodiments, managers assist artists to browse and upload media files, send and respond to messages, send and respond to requests to use media files, initiate negotiations of a media file between other managers and artists, and send media files to other artists and managers.

In some embodiments, watermarks can be data or metadata establishing authenticity or copyright protection of a media file to secure the content, such as but not limited to inaudible watermarking, frequency domain watermarking, time domain watermarking, spread spectrum watermarking, quantization index modulation (QIM) watermarking, perceptual shaping watermarking, fragile watermarking, error detection watermarking, signature-based watermarking, non-blind watermarking, and audio fingerprinting.

In some embodiments, clients can be users who access the server, such as but not limited to managers as defined above, music producers, A&R, talent scouts, music scouts, executives, managers, publishers, distributors, lawyers, copyright administrators, licensing agents, artists as described above, writers, composers, bands, lyricists, producers, singers, instrumentalists, performers, collaborators, influencers, musicians, engineers, editors, mixers, DJs, mixers, and anyone else who contributes to the creation of media.

FIG. 1 illustrates a high-level flow diagram of a server connected to clients over a network, wherein the clients 101a, 101b, and 101c, can access the server 103, using the network 102. Clients 101a, 101b, and 101c can upload files and make requests to server 103 over network 102, and server 103 can process requests and send data to clients 101a, 101b, and 101c.

Figure 2:
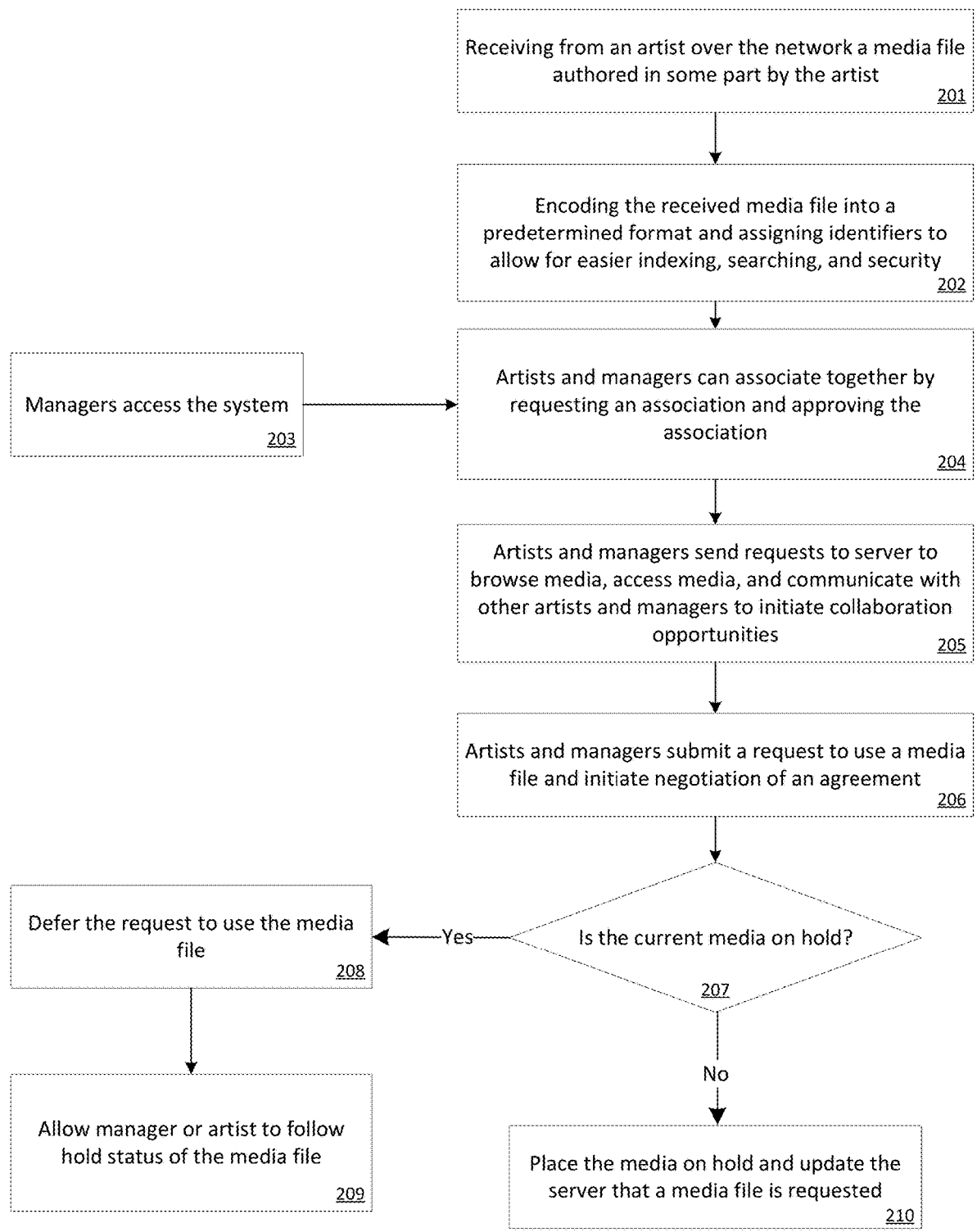
FIG. 2 illustrates a flow diagram for a server to regulate access to files based on user inputs and affiliations in accordance with some embodiments.

FIG. 2 illustrates a flow diagram for a server to regulate access to media files based on user inputs. In some embodiments, an artist can access a user interface, wherein the server receives a media file authored in some part by an artist 201. The server then encodes the media file into a predetermined format to enable the media file to be indexed, searched, and securely stored 202. In some embodiments, a manager can access a user interface to interact with the server 203. With the managers and artists both accessing the server, artists and managers can associate together within the server by either a manager or an artist sending a request to associate, and the receiving manager or artist can approve of the association 204. The artists and managers can send requests to browse the media files that are stored on the server, listen to media files, and communicate with other artists and managers over collaboration opportunities 205. When artists and managers identify a media file that they would like to use, they can submit a request over the server to initiate a negotiation of an agreement over the source or use of the media file 206. The server will check whether the media file is on hold due to a prior negotiation of agreement that is taking place 207. If the media file is available, indicating the absence of a current negotiation of agreement underway, then a hold is placed on the media file 210. If the media file is unavailable, indicating a current negotiation is underway, then the request to negotiate an agreement of the media file is deferred 208. A deferral to negotiate an agreement of a media file means that the user may be able to negotiate an agreement later, depending on the outcome of the negotiation that is currently underway for the media file. In some embodiments, the deferral could put the request from the manager or artist into a queue for the media file. A deferral allows the option for the manager or artist to follow the status of the media file to indicate their interest in the media file and to receive updates on the status of the media file on the server 209.

Figure 3:
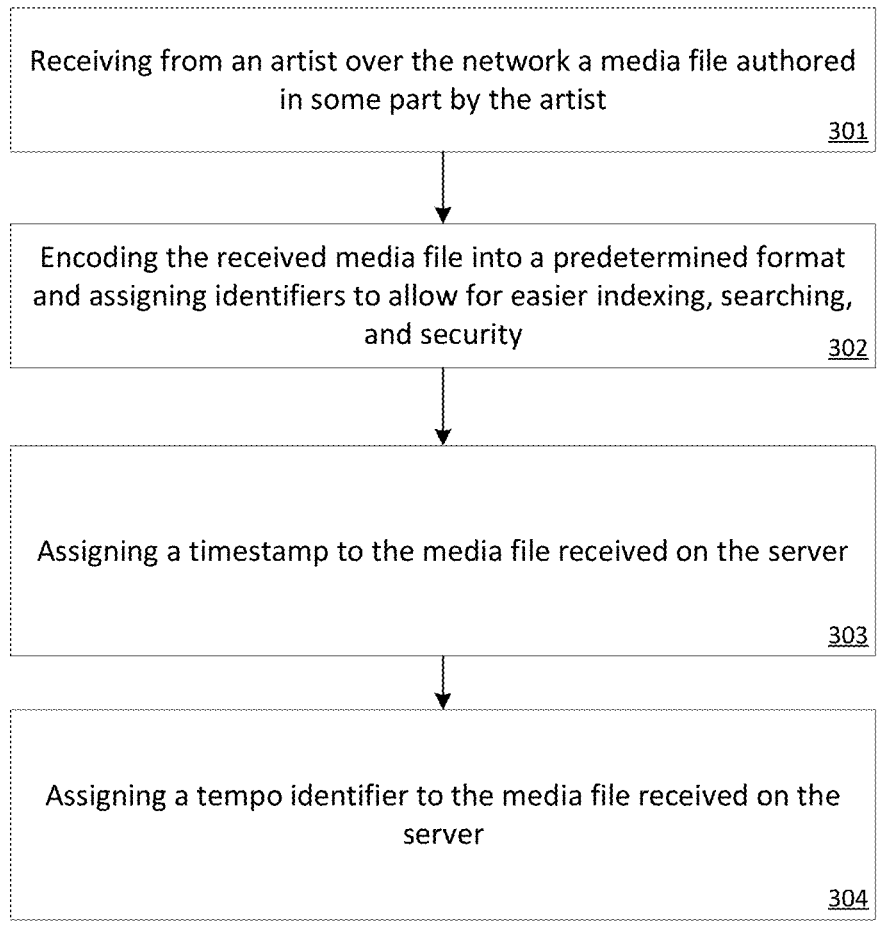
FIG. 3 illustrates a flow diagram for the server receiving a media file and assigning identifiers to the media file.

FIG. 3 illustrates a flow diagram for the server receiving a media file and assigning identifiers to the media file. In some embodiments, an artist can access a user interface, wherein the server receives a media file authored in some part by an artist 301. The server then encodes the media file into a predetermined format to enable the media file to be indexed, searched, and securely stored 302. Then, in some embodiments, a timestamp indicator is assigned to the media file, designating when the media file was uploaded onto the server 303. Then, in some embodiments, a tempo identifier is assigned to the media file to indicate the beats per minute (BPM) of the media file 304.

Figure 4:
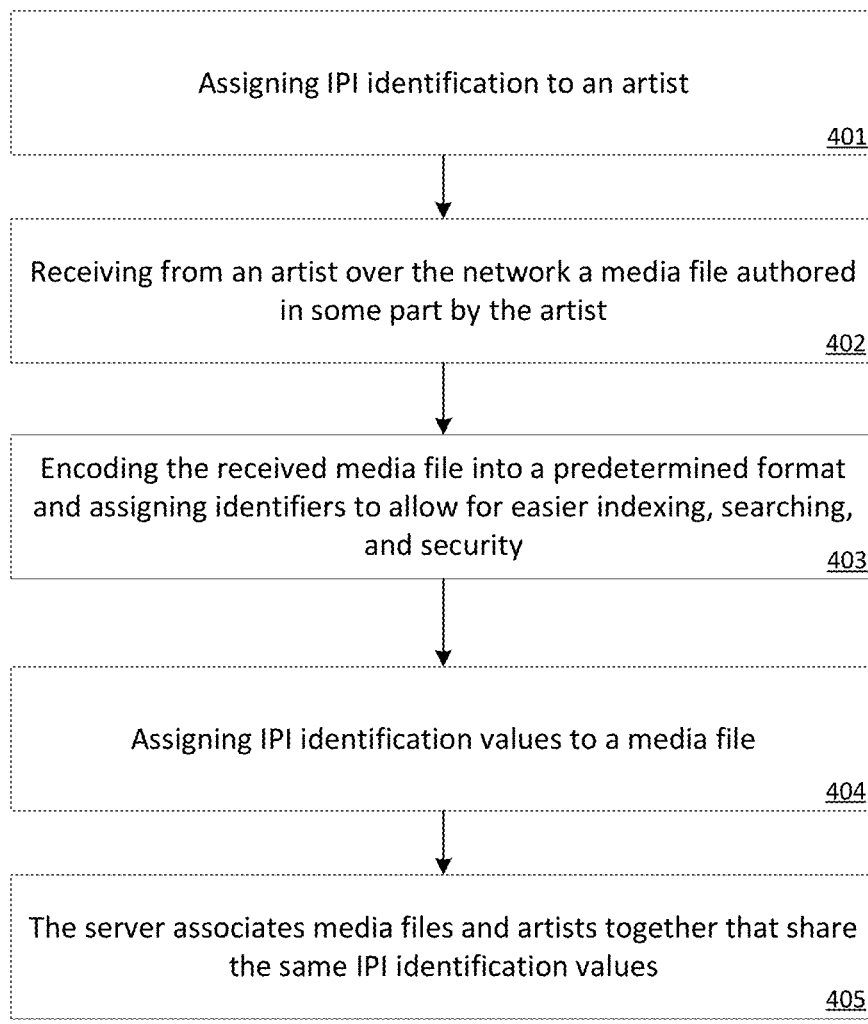
FIG. 4 illustrates a flow diagram for assigning an IPI identifier to an artist and associating the artist with media files that have the same IPI identifier.

FIG. 4 illustrates a flow diagram for assigning an IPI identifier to an artist and associating the artist with media files that have the same IPI identifier. In some embodiments, the artist or manager can assign an IPI identification number to an artist through the user interface 401. An artist can access a user interface, wherein the server receives a media file authored in some part by an artist 402. The server then encodes the media file into a predetermined format to enable the media file to be indexed, searched, and securely stored 403. The IPI identification number is one way in which the music industry identifies the rights of media files. The manager or artist can also assign IPI numbers to any media files that an artist has authored or co-authored 404. The server will then associate media files and artists with matching IPI identification values together 405.

Figure 5:
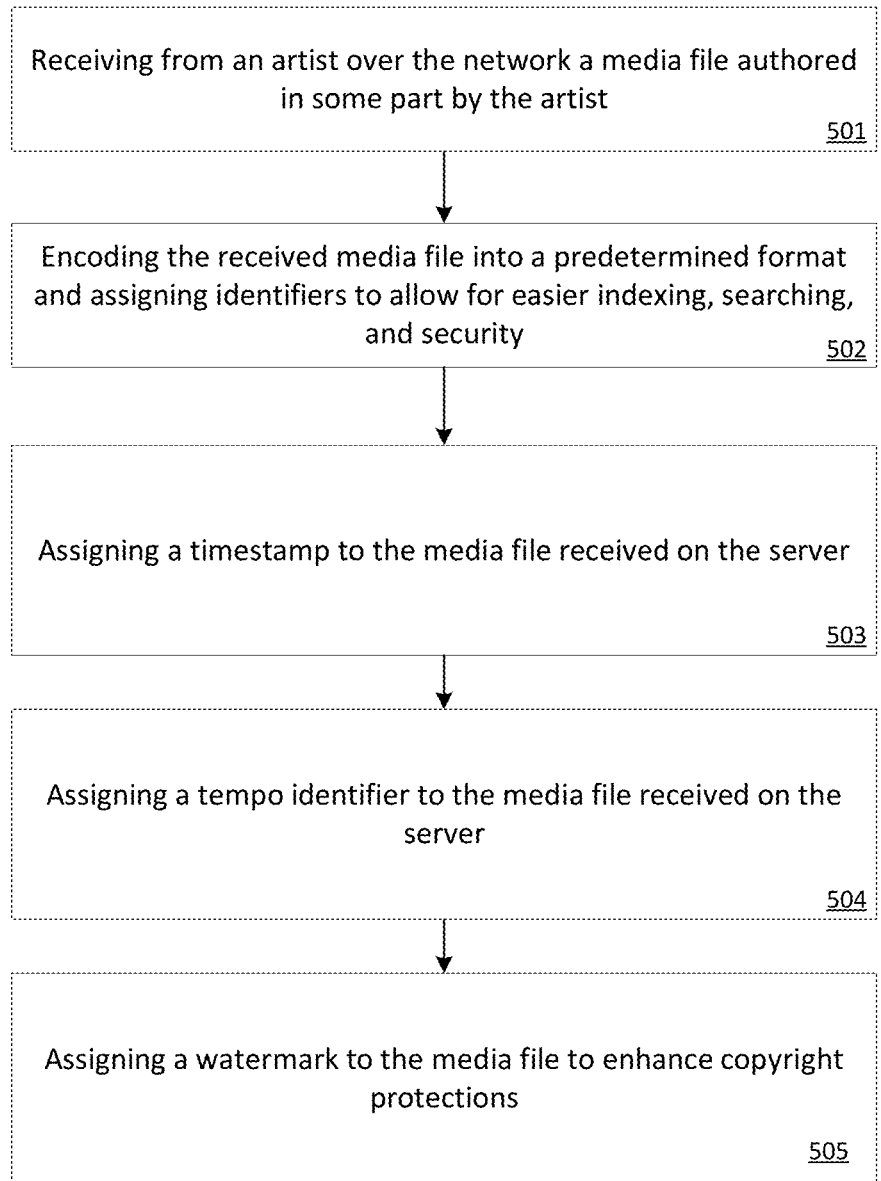
FIG. 5 illustrates a flow diagram for assigning a watermark to an uploaded media file to enhance copyright protections.

FIG. 5 illustrates a flow diagram for assigning a watermark to an uploaded media file to enhance copyright protections. In some embodiments, an artist can access a user interface, wherein the server receives a media file authored in some part by an artist 501. The server then encodes the media file into a predetermined format to enable the media file to be indexed, searched, and securely stored 502. Then, in some embodiments, a timestamp indicator is assigned to the media file, designating when the media file was uploaded onto the server 503. Then, in some embodiments, a tempo identifier is assigned to the media file to indicate the beats per minute (BPM) of the media file 504. The media file can then be assigned a watermark, which can be embedded in the encoded media file data, enhancing the copyright protections of the media file 505.

Figure 6:
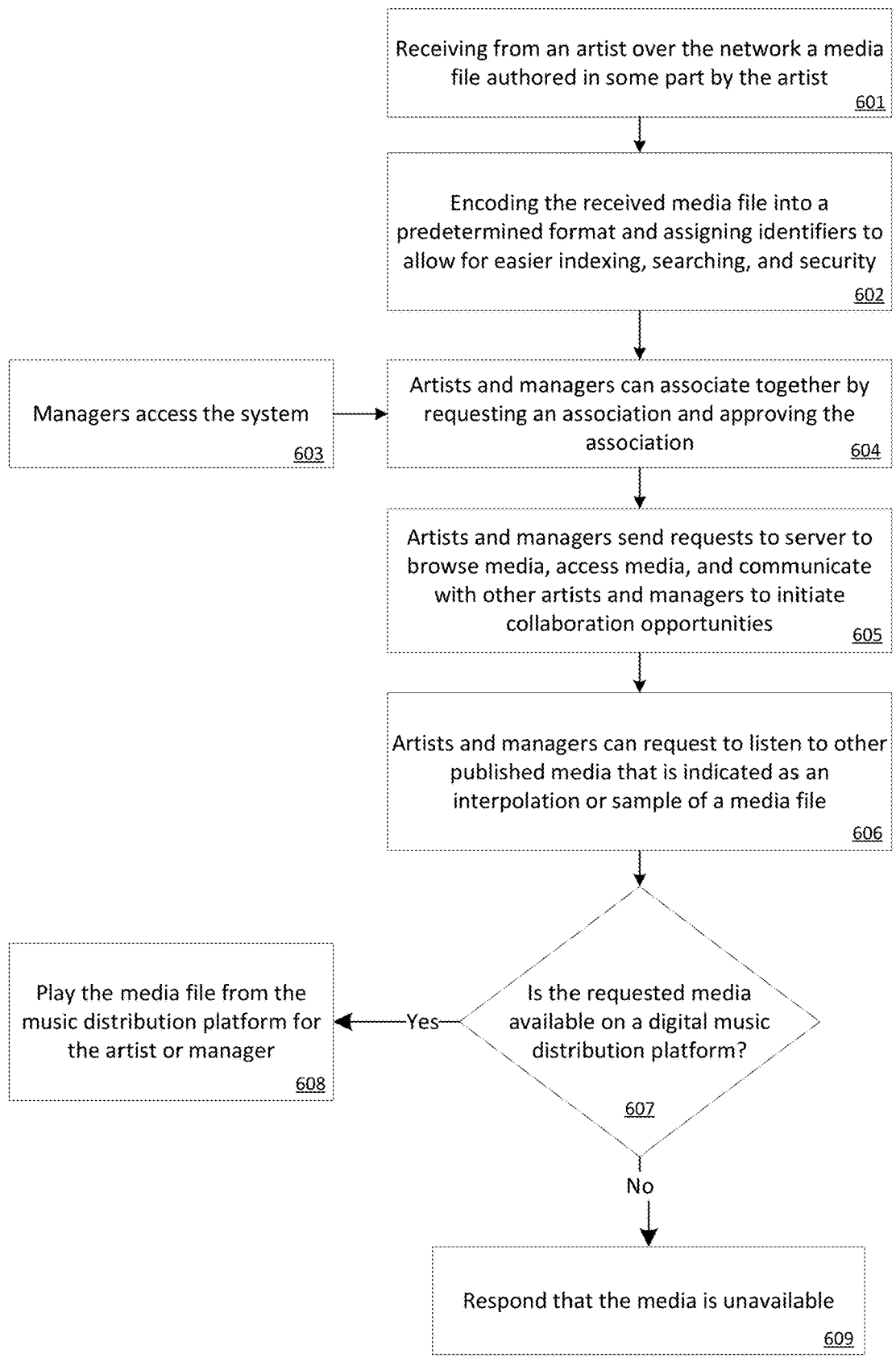
FIG. 6 illustrates a flow diagram for requesting media files that are associated via samples and interpolations to be played using a digital music distribution platform.

FIG. 6 illustrates a flow diagram for requesting media files that are associated via samples and interpolations to be played using a digital music distribution platform. In some embodiments, an artist can access a user interface, wherein the server receives a media file authored in some part by an artist 601. The server then encodes the media file into a predetermined format to enable the media file to be indexed, searched, and securely stored 602. In some embodiments, a manager can access a user interface to interact with the server 603. With the managers and artists both accessing the server, artists and managers can associate together within the server by either a manager or an artist sending a request to associate, and the receiving manager or artist can approve of the association 604. The artists and managers can send requests to browse the media files that are stored on the server, listen to media files, and communicate with other artists and managers over collaboration opportunities 605. Artists and managers can request to listen to published media files that are indicated as an interpolation of the uploaded media file, or wherein the media file has been sampled and added into the published media file 606. When a request is made to listen to a published media file that has been referenced either as an interpolation or sample of an uploaded media file, a request is made through the server to a digital music distribution platform or a music streaming service to play the published media file 607. If the digital music distribution platform contains the requested published media file, then the published media file is played for the artist or manager within the user interface 608. If the digital music distribution platform does not have the requested published media available, then the user interface responds to the artist or manager that the requested published media file is unavailable 609.

Various aspects also can be implemented as part of at least one service or Web service, such as may be part of service-oriented architecture. Services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, a Bluetooth wireless technology device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from those described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The invention claimed is:

1. A computer-implemented method connecting artists and managers in the media industry together via a network, wherein a server stores and regulates access to media files based on the affiliations and agreements of managers and artists, comprising:
   receiving, from an artist over the network to the server, a media file authored in some part by the artist, said media file being encoded in a predetermined format and assigning at least one identifier value to the media file,
   permitting the association of a manager with the artist, wherein the manager and the artist approve of the association and allowing the manager associated with the artist to perform tasks on behalf of the artist,
   allowing, through the server, the manager and the artist to browse and listen to media files based on identifiers assigned to the media files, wherein the manager or the artist can request to initiate negotiation of an agreement to the source or use of a media file,
   processing by the server a request to initiate negotiation of an agreement to the source or use of a media file by sending agreement notifications to the associated manager the associated artist of the media file and tagging the media file with a hold status so that any further request via the server to initiate negotiation of an agreement can be deferred until the media file is no longer under negotiation of an agreement.

2. The computer-implemented method of claim 1, wherein a tempo identifier is assigned to the media file after it is received to the server.

3. The computer-implemented method of claim 1, wherein a timestamp is assigned to the media file, indicating the time it was received by the server.

4. The computer-implemented method of claim 1, wherein a watermark is inserted into the media file after it is received to the server.

5. The computer-implemented method of claim 3, wherein a watermark is inserted into the media file after it is received to the server.

6. The computer-implemented method of claim 1, wherein artists and media files are associated together using IPI numbers or other industry standard identifications.

7. A computer-implemented method connecting artists and managers in the music industry together via a network, wherein a server stores and regulates access to music files based on the affiliations and agreements of managers and artists, comprising:
   receiving, from an artist over the network to the server, a music file authored in some part by the artist, said music file being encoded in a predetermined format and assigning at least one identifier value to the music file,
   permitting the association of a manager with the artist, wherein the manager and the artist approve of the association and allowing the manager associated with the artist to perform tasks on behalf of the artist,
   allowing, through the server, the manager and the artist to browse and listen to music files based on identifiers assigned to the music files, wherein the manager or the artist can request to initiate negotiation of an agreement to the source or use of a music file,
   processing by the server a request to initiate negotiation of an agreement to the source or use of a music file by sending agreement notifications to the associated manager the associated artist of the music file and tagging the music file with a hold status so that any further request via the server to initiate negotiation of an agreement can be deferred until the music file is no longer under negotiation of an agreement.

8. The computer-implemented method of claim 7, wherein a tempo identifier is assigned to the music file after it is received to the server.

9. The computer-implemented method of claim 7, wherein a timestamp is assigned to the music file, indicating the time it was received by the server.

10. The computer-implemented method of claim 7, wherein a watermark is inserted into the music file after it is received to the server.

11. The computer-implemented method of claim 9, wherein a watermark is inserted into the music file after it is received to the server.

12. The computer-implemented method of claim 7, wherein artists and music files are associated together using IPI numbers or other industry standard identifications.

13. The computer-implemented method of claim 7, wherein any published media file that is referenced as an interpolation or sample can be viewed and listened to by requesting the published media file data from a music streaming service or a digital music distribution platform.

14. A computer-implemented method connecting artists and managers in the media industry together via a network, wherein a server stores and regulates access to media files based on the affiliations and agreements of managers and artists, comprising:
  receiving, from an artist over the network to the server, a media file authored in some part by the artist, said media file being encoded in a predetermined format and assigning at least one identifier value to the media file, the at least one identifier value indicates whether the media file is sampled or interpolated into another published media file,
  permitting the association of a manager with the artist, wherein the manager and the artist approve of the association and allowing the manager associated with the artist to perform tasks on behalf of the artist,
  allowing, through the server, the manager and the artist to browse and listen to media files based on identifiers assigned to the media files, wherein the manager or the artist can request to initiate negotiation of an agreement to the source or use of a media file,
  processing by the server a request to initiate negotiation of an agreement to the source or use of a media file by sending agreement notifications to the associated manager the associated artist of the media file and tagging the media file with a hold status so that any further request via the server to initiate negotiation of an agreement can be deferred until the media file is no longer under negotiation of an agreement.

15. A computer-implemented method of claim 14, wherein a tempo identifier is assigned to the media file after it is received to the server.

16. A computer-implemented method of claim 14, wherein a timestamp is assigned to the media file, indicating the time it was received by the server.

17. A computer-implemented method of claim 14, wherein a watermark is inserted into the encoded media file after it is received to the server.

18. A computer-implemented method of claim 16, wherein a watermark is inserted into the encoded media file after it is received to the server.

19. A computer-implemented method of claim 14, wherein artists and media files are associated together using IPI numbers or other industry standard identifications.

20. A computer-implemented method of claim 14, wherein any published media file that is referenced as an interpolation or sample can be viewed and listened to by requesting the published media file data from a music streaming service or a digital music distribution platform.

\* \* \* \* \*